United States Patent [19]

Jervis

[11] 4,268,329
[45] May 19, 1981

[54] PROCESS FOR PREPARING A HERMETICALLY SEALED ASSEMBLY

[75] Inventor: James E. Jervis, Menlo Park, Calif.

[73] Assignee: Raychem Corporation, Menlo Park, Calif.

[21] Appl. No.: 80,544

[22] Filed: Oct. 1, 1979

Related U.S. Application Data

[63] Continuation of Ser. No. 943,196, Sep. 18, 1978, abandoned, which is a continuation of Ser. No. 717,695, Aug. 25, 1976, abandoned.

[30] Foreign Application Priority Data

Oct. 31, 1975 [GB] United Kingdom .............. 45222/75

[51] Int. Cl.³ ...................... H01B 13/06; H01B 17/50
[52] U.S. Cl. .......................................... 156/51; 73/52; 138/99; 156/86
[58] Field of Search ................. 156/49, 51, 64, 84–87, 156/145–147, 156, 285, 286, 287, 296, 303.1, 358, 360, 378; 138/99, 168, 21 R, 22 R, 84 R; 73/52, 262, 410, 406, 409, 420; 264/40, 80, 100, 230, 342 R; 116/65, 70, 112, 114 P, DIG. 8, DIG. 9, DIG. 22

[56] References Cited

U.S. PATENT DOCUMENTS

| | | | |
|---|---|---|---|
| 2,027,962 | 1/1936 | Currie | 138/99 |
| 2,062,435 | 12/1936 | Weiland | 116/114 P |
| 2,370,958 | 3/1945 | Hellier | 156/87 |
| 2,429,121 | 10/1947 | Crowley | 156/87 |
| 2,545,243 | 3/1951 | Rumsey | 156/86 |
| 2,568,129 | 9/1951 | Morris | 156/64 |
| 3,023,607 | 3/1962 | Bolch et al. | 116/114 P |
| 3,086,242 | 4/1963 | Cook et al. | 138/99 |
| 3,174,851 | 3/1965 | Buehler | 75/170 |
| 3,178,944 | 4/1965 | Templeton | 73/420 |
| 3,243,211 | 3/1966 | Wetmore | 287/78 |
| 3,297,819 | 1/1967 | Wetmore | 156/48 |
| 3,351,436 | 11/1967 | Rozner et al. | 75/170 |
| 3,379,218 | 4/1968 | Conde | 138/99 |
| 3,400,028 | 9/1968 | Wilkholm | 156/64 |
| 3,426,119 | 2/1969 | Chapman | 156/86 |
| 3,452,708 | 7/1969 | Richardson | 73/146.8 |
| 3,470,046 | 9/1969 | Verdin | 156/86 |
| 3,514,081 | 5/1970 | Cavanaugh et al. | 156/86 |
| 3,717,717 | 2/1973 | Cunningham | 156/49 |
| 3,889,047 | 6/1975 | Carver | 156/51 |
| 4,085,286 | 4/1978 | Horsma et al. | 174/92 |

FOREIGN PATENT DOCUMENTS

| | | |
|---|---|---|
| 801735 | 9/1958 | United Kingdom .................. 73/420 |
| 944496 | 12/1963 | United Kingdom .................. 73/420 |
| 1155470 | 6/1969 | United Kingdom . |
| 1211988 | 11/1970 | United Kingdom . |
| 1346479 | 2/1974 | United Kingdom . |

Primary Examiner—John E. Kittle
Attorney, Agent, or Firm—Lyon & Lyon

[57] ABSTRACT

In the connection and encapsulation of substrates such as cables by covering members such as heat-recoverable sleeves, typically provided with adhesive or mastic linings, the formation upon heating of a desired hermetic seal between the substrate and the covering member is checked by using a device which can detect the excess air pressure which, once the hermetic seal has been made, builds up within a space between the covering member and the substrate. Preferably this is done by means of a probe which passes between the covering member and the substrate into said space and which is connected to a pressure sensitive device such as a balloon or a manometer. After use, the probe, which is preferably made from a plastics material such as nylon, can be fused or deformed to ensure that the hermetic seal remains intact.

13 Claims, 6 Drawing Figures

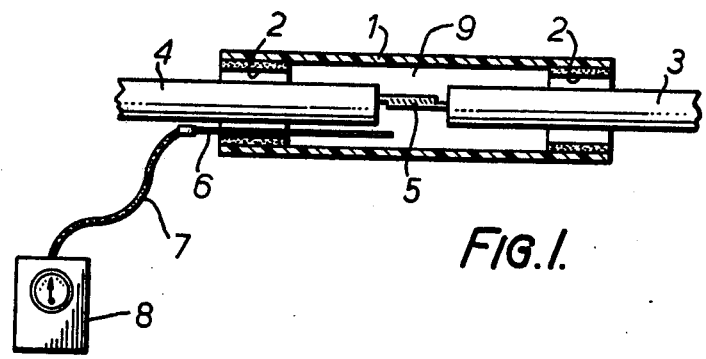
FIG.1.
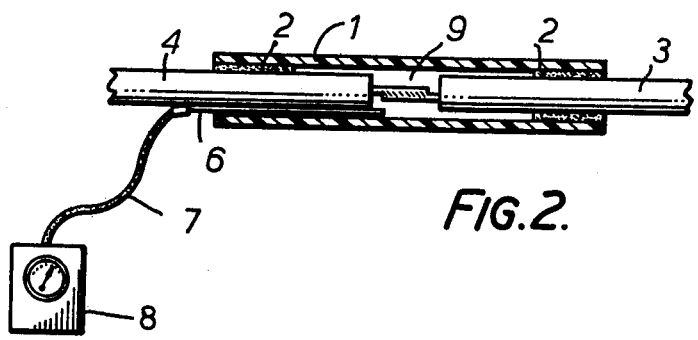
FIG.2.
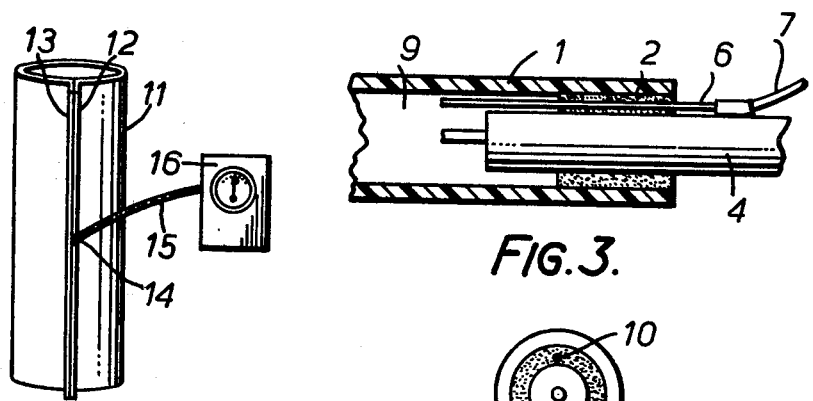
FIG.3.
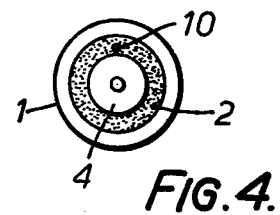
FIG.5.
FIG.4.

4,268,329

PROCESS FOR PREPARING A HERMETICALLY SEALED ASSEMBLY

RELATED APPLICATIONS

This is a continuation of application Ser. No. 943,196, filed Sep. 18, 1978 which was a continuation of application Ser. No. 717,695 filed Aug. 25, 1976 both now abandoned.

Attention is also drawn to co-pending application Ser. No. 945,427 entitled "Process for Preparing a Hermetically Sealed Assembly" filed on Sep. 25, 1978 by David A. Horsma and Stephen H. Diaz which describes and broadly claims the general concept upon which the present invention is based, which application is a continuation of Ser. No. 717,696 filed on Aug. 25, 1976, now abandoned.

BACKGROUND OF THE INVENTION

This invention relates to the covering, e.g. for connection and/or encapsulation purposes, of substrates and, more especially, relates to the formation of an assembly comprising a substrate and a covering which is hermetically sealed around the substrate. The invention is especially applicable to heat-shrinkable covering articles used in the insulation and connection of, for example, pipelines and electric cables.

Heat-recoverable articles, which have been deformed from an original configuration and which are capable of returning towards that configuration on the application of heat, are well known and are generally made from polymeric materials, especially cross-linked polymeric materials, such, for example, as those described in U.S. Pat. Nos. 2,027,962 and 3,086,242, the disclosures of which are incorporated herein by reference. More recently, heat-recoverable articles have also been made from certain alloys, sometimes called "memory metals", as described, for example, in U.S. Pat. Nos. 3,174,851 and 3,351,463, the disclosures of which are also incorporated herein by reference.

One of the main uses of these heat-recoverable articles, especially when made from polymeric materials such as cross-linked polyethylene, has been in the field of electrical insulation and, more especially, in the connection and encapsulation of electrical conductors such as wires and cables. They have also been extensively used in the insulation and connection of service lines such as pipelines.

In these applications the heat-recoverable article, usually in the form of a heat-shrinkable tube or a wrap-around sleeve, as described, for example, in U.S. Pat. Nos. 3,243,211; 3,297,819 and 3,379,218 and British Pat. Nos. 1,155,470; 1,211,988 and 1,346,479, respectively, the disclosures of which are also incorporated herein by reference, is caused to shrink about the substrate(s) being insulated or connected. In most of these applications it is necessary that a good seal is made between the ends of the heat-recoverable article and the substrate as protection against the ingress of moisture and small insects etc. For this reason the heat-recoverable articles are commonly provided with an inner layer of adhesive or other sealant, e.g. a mastic, at least at their terminal portions. However, even then it is difficult to ensure that a reliable seal is obtained in all cases upon recovery and, more particularly, it is difficult to determine afterwards whether or not a moisture- and insect-proof seal has in fact been obtained.

The formation of a hermetic seal is, of course, also important when other forms of covering are used to connect or encapsulate the substrates. For example dimensionally-recoverable coverings may be employed in which conventional elastomeric recovery is used, including dimensionally-recoverable articles which comprise an elastomeric outer tube which is held in a stretched state by an inner tube which, upon heating, weakens and thus allows the elastomeric outer tube to recover. Other coverings may form the required hermetic seal by the simple application of heat which activates an adhesive or mastic lining to form the seal.

In all of the above instances the heating used during formation of the covered assembly leads to a build up of air pressure within the covering (which may in some cases lead to disruption of the seal).

SUMMARY OF THE INVENTION

The present invention is based on my surprising observation that this build-up of air pressure when the covering is heated may be used to advantage to determine that a hermetic seal has in fact been made.

The present invention provides a process for preparing an assembly comprising a substrate and a covering which is hermetically sealed around the substrate, which process comprises causing at least one covering member to seal hermetically around the substrate while heating said covering member, wherein the formation of the hermetic seal is signalled by a detection device which detects increased air pressure in a space which is open to the atmosphere before hermetic sealing has taken place but which becomes closed to the atmosphere when said hermetic sealing has taken place, the air in said space being heated by the heating of the covering member.

In most preferred applications of the present invention the covering member is dimensionally-recoverable, especially heat-recoverable, and will be of generally tubular form with at least one open end, e.g. a heat-shrinkable end cap for the termination of cables, or, more commonly, two open ends, e.g. a heat-shrinkable tube for the connection of wires and cables (the term "generally tubular" as used herein including, for example, tubes of circular and non-circular cross-section as well as Y-shaped, T-shaped and X-shaped members). These covering members are generally provided with a lining of an adhesive or a mastic, at least in the regions, e.g. their terminal portions, where the hermetic seal is formed. There may, of course, be more than one covering member used in a specific application, but, for convenience, the invention will be described in terms of the use of a single covering member.

In practice the covering member is placed in position about the substrate(s) to which it is to be hermetically sealed during the formation of the connected or encapsulated assembly. It is then heated, usually initially at the end(s), to actuate any adhesive or mastic lining and/or to cause it to recover. The air pressure inside the covering member builds up by this heating and may be further increased by any dimensional recovery of the covering member. Initially some air escapes via the open end(s) of the covering member but when a hermetic seal is made it can no longer escape in this way. Thus the build-up and maintenance of increased air pressure in a space within the covering is a reliable indication that a hermetic seal has been made.

In accordance with the present invention this build-up of air pressure within a space which is initially open to the atmosphere but which is closed when a hermetic seal is made is detected by the use of a suitable detection device. By the use of such a device not only can the build-up of increased air pressure be detected and monitored, but also the air pressure can be relieved once a hermetic seal has been made thus allowing full dimensional recovery and/or obviating subsequent damage to the seal by prolonged pressure from air trapped within the covering.

It will be appreciated that, given the basic concept of the present invention, it may take various practical forms. For example the detection device may employ any method of detection but it will, in general, be unnecessary and inappropriate to employ sophisticated apparatus. Amongst simple detection devices which may be employed there may be mentioned, for example, a bag or balloon which will inflate as it communicates with the pressurized air, a whistle or a manometer. In most applications it will be preferred if the device can be detached after use and, in this respect, it will obviously be preferable if it can be reused. However, this can readily be achieved by conventional attachment and detachment means, for example, a screw-threaded or bayonet-type fitting, either to the covering member itself or to a replaceable probe.

Similarly, the detection device may be used in various ways. In a preferred method the detection device is provided with a probe which is placed into the relevant space inside the covering before recovery but which does not puncture or otherwise pass through the covering member. For example, the probe may be inserted into the space between the covering member and the substrate, or provided that the covering member is non-integral may be inserted between two portions of the covering member, for example at the join of a wrap-around sleeve. When an adhesive or mastic lining is provided the probe may pass through the lining so that after the seal is made it may be withdrawn, whereupon the adhesive or mastic flows to maintain the seal. Alternatively, the probe may itself be made from a material which can be melted, crushed or otherwise deformed to maintain the hermetic seal after use. A meltable plastics probe, e.g. made from nylon, is especially useful in this respect.

In some applications of the present invention it may be appropriate deliberately to form the space in which increased air pressure is to be detected by suitably shaping the covering member and/or the substrate. For example, one closure device to which the present invention is especially applicable is a "splice case" as described and claimed in U.S. application Ser. No. 509,837, filed 27th Sep., 1974 (now abandoned) and the continuation-in-part thereof application Ser. No. 601,344, filed 4th Aug., 1975 by David A. Horsma and Stephen H. Diaz now U.S. Pat. No. 4,085,286. In this "splice case" the covering member is a closure article comprising first and second members adapted to be brought together to form a generally tubular structure having a central cavity portion, the first member being heat-recoverable and the second member being non-heat-recoverable, and provided with means for maintaining said members together during heat-recovery of said first member, the structure so formed being adapted at at least one end thereof to heat-recover around and seal a plurality of cables inserted therein. In a preferred embodiment, the central cavity portion has positioned therein a rigid, dimensionally stable container member for surrounding a splice. Especially when such a splice case is used for the connection of pressurized cables it may be advantageous to create such as artificial space for detection purposes. This may be done, for example, by shaping the rigid container member, for example by providing it with a peripheral groove.

BRIEF DESCRIPTION OF THE DRAWINGS

Various embodiments of the present invention will now be described, by way of example only, with reference to the accompanying drawings, in which FIG. 1 represents, in cross section, the formation of a joint between two substrates using a heat-recoverable tubular sleeve;

FIG. 2 shows the joint of FIG. 1 after recovery of the tubular sleeve;

FIG. 3 shows in more detail one end of the joint of FIG. 2;

FIG. 4 is another view showing the joint of FIG. 3 immediately after the removal of the probe;

FIG. 5 illustrates the application of the present invention to a heat-recoverable wrap-around sleeve.

DETAILED DESCRIPTION OF THE DRAWINGS

Figure 6:
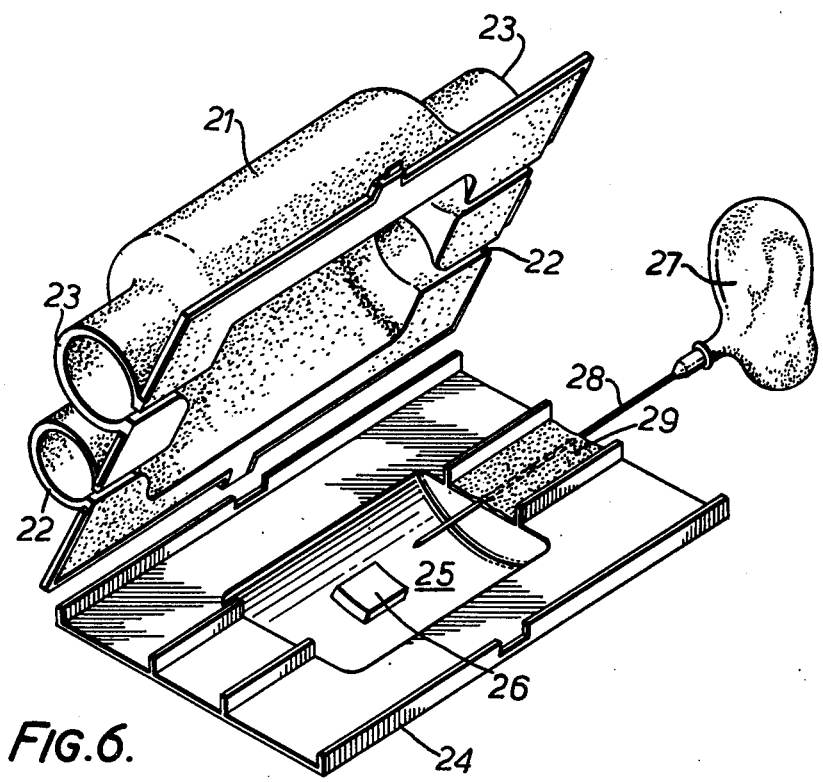
FIG. 6 illustrates the application of the present invention to a splice case.

In FIG. 1 there is shown a tubular heat-shrinkable sleeve 1 provided with an inner lining 2 of adhesive at each of its ends. The heat-recoverable tube 1 is positioned about two substrates 3 and 4 which are insulated electrical conductors, the conductive elements of which have been joined at 5. In accordance with the present invention a probe 6 in the form of a hollow needle is inserted between the adhesive lining 2 and the substrate 4 so as to communicate with a space 9 in the central portion of the heat-recoverable tube 1. The probe 6 is connected via flexible load 7 to a manometer 8.

FIG. 2 shows the position after recovery. The heat-shrinkable tube 1 has shrunk down about substrates 3 and 4 and the adhesive lining 2 has been caused to flow to form a seal with the substrates. The manometer 8 registers the increase in air pressure within space 9 which indicates that a hermetic seal has been made.

FIG. 3 shows more clearly how the hollow needle 6 has been encapsulated in the adhesive lining 2.

Referring to FIG. 4 the joint is shown immediately after removal of the probe needle 6 whilst the adhesive 2 is still pliable. The removal of the probe 6 has left a hole 10 which will quickly be closed by the flow of the still-pliable adhesive 2.

Turning now to FIG. 5, there is shown here the application of the present invention to a different type of heat-recoverable article. Here the heat-recoverable article 11 comprises a wrap-around sleeve provided with two abutting rail members 12 and 13. Before recovery these rail members are held firmly together by the provision of a channel member (not shown). Typically the wrap-around sleeve will be provided with an inner layer of adhesive. In this application the probe 14 will be inserted between the rail member 12 and 13, the probe 14 being connected by a flexible lead 15 to a manometer 16. After recovery the probe 14 may readily be withdrawn whereupon the residual aperture will quickly be closed by means of the adhesive and by the pressure of the channel member upon the rail members 12 and 13.

Referring finally to FIG. 6, there is shown a splice case of the type described and claimed in U.S. application Ser. No. 601,344 referred to above. The splice case is similar to that shown in FIG. 20 of the above-mentioned application and comprises a heat-recoverable upper portion 21 having end openings 22 and 23 adapted to receive cables of different dimensions. The internal surfaces of these end openings and of the intermediate and flange portions are coated with an adhesive (not shown). The lower complementary tray portion 24 which is not heat-recoverable is formed with a cavity 25 adapted to hold the cable splices and is also provided with a small container 26 holding a dessicant. The internal surfaces of the tray portion 24 may also, if desired, be coated with an adhesive.

In accordance with the present invention the cavity 25 where the splices are housed is brought into communication with a detection device, in this case a balloon 27, by means of a tubular nylon probe 28, which is embedded in a layer of adhesive 29.

When the splices have been made and have been housed securely in the cavity 25, the upper heat-recoverable part 21 and the lower non-recoverable tray part 24 are securely clamped together and heated, preferably electrically, as described in application No. 601,344 whereupon the heat-recoverable part 21 (or the heat-recoverable portions thereof) recover and the adhesive flows to provide the desired hermetically sealed encapsulation. Under this heating the air pressure within the central cavity increases and, once a hermetic seal has been made, this causes the balloon to inflate, thus signalling that the encapsulation is satisfactory. The balloon can then be dispensed with and the nylon probe can either be fused or withdrawn.

I claim:

1. A process for preparing an assembly comprising a substrate and a covering which is hermetically sealed around the substrate, which process comprises causing at least one preformed dimensionally recoverable covering member to seal hermetically around the substrate by heating said covering member to cause it to recover dimensionally, wherein the formation of the hermetic seal is signalled at the time of said formation by a detection device which detects increased air pressure caused by said heating in a space which is open to the atmosphere before hermetic sealing has taken place but which becomes closed to the atmosphere when said hermetic sealing has taken place, said device communicating with said space via a probe which is inserted between the substrate and the covering and which is made of a disposable material which is melted, crushed or otherwise deformed after use to preserve the hermetic seal.

2. A process for preparing a hermetically sealed assembly comprising a substrate and a covering which is hermetically sealed around the substrate and comprises:
   placing at least one preformed heat recoverable covering member over said substrate;
   heating said covering member to cause it to dimensionally recover and seal hermetically around the substrate;
   inserting a probe between said substrate and said covering into a space which is open to the atmosphere before hermetically sealing but which becomes closed to the atmosphere upon completion of said hermetic sealing, said probe having a detection device attached thereto for detecting increased air pressure, said device communicating with said space via said probe, said probe being made from a material which can be melted, crushed or otherwise deformed after use to preserve the hermetic seal and;
   deforming said probe after the assembly has been hermetically sealed to preserve the seal.

3. A process for preparing an assembly comprising a substrate and a covering which comprises:
   placing at least one preformed heat recoverable covering member over said substrate;
   heating said covering member to cause it to dimensionally recover and seal hermetically around the substrate;
   inserting a probe between two parts of said covering into a space which is open to the atmosphere before hermetic sealing but which becomes closed to the atmosphere upon completion of said hermetic sealing, said probe having a detecting device attached thereto for detecting increased air pressure, said device communicating with said space via said probe; which probe is made from a material which can be melted, crushed or otherwise deformed after use; and
   deforming said probe after the assembly has been hermetically sealed to preserve the seal.

4. A process as claimed in claim 3 wherein the covering member is generally tubular.

5. A process as claimed in claim 3 wherein the covering member is a closure article comprising first and second members adapted to be brought together to form a generally tubular structure having a central cavity portion, the first member being heat-recoverable and the second being non-heat-recoverable, and provided with means for maintaining said members together during heat-recovery of said first member, the structure so formed being adapted at at least one end thereof to heat-recover around and seal a plurality of cables inserted therein.

6. A process as claimed in claim 5, wherein the central cavity portion has positioned therein a rigid, dimensionally stable container member for surrounding a splice.

7. A process as claimed in claim 3 wherein the substrate and/or the convering member is shaped so as to form the space in which increased air pressure is detected.

8. A process for preparing an assembly comprising a substrate and at least one covering which is hermetically sealed around the substrate, which process comprises the steps of:
   placing at least one dimensionally recoverable covering member having at least one open end about the substrate;
   said covering member being provided with a lining of an adhesive or a mastic at least in those regions where the hermetic seal is formed;
   causing at least one covering member to dimensionally recover and seal hermetically around the substrate;
   inserting a probe through the adhesive or mastic between said substrate and said covering or between two parts of said covering to a space within said covering remote from said open end, which space is in communication with the atmosphere before hermetic sealing has taken place but which becomes closed to the atmosphere after said hermetic sealing has taken place;
   detecting the formation of the hermetic seal at the time of formation by a detection device communicating with said probe which monitors increased air pressure caused by the heating in said space;

withdrawing the probe from the adhesive or mastic without breaking the hermetic seal.

9. A process for preparing a hermetically sealed assembly comprising a substrate and a covering which comprises the steps of:

placing at least one preformed covering member over said substrate, said covering being provided with a lining of adhesive or mastic, at least in those regions where the hermetic seal is formed;

heating said covering member to cause it to hermetically seal around the substrate;

inserting a probe through said adhesive or mastic between said substrate and said covering into a space which is open to the atmosphere before hermetic sealing but which becomes closed to the atmosphere upon completion of said hermetic sealing, said probe having a detection device attached thereto for detecting increased air pressure said device communicating with said space via said probe; and removing said probe from said assembly without affecting the hermetic seal.

10. A process for preparing an assembly comprising a substrate and a covering which is hermetically sealed around the substrate, which process comprises: causing at least one preformed covering member to seal hermetically around the substrate; heating said covering member, said covering member having an adhesive or mastic lining at the seal-forming portions thereof and having dimensions which are substantially unchanged by said heating; inserting a detection device between the covering member and the substrate through the adhesive or mastic, wherein the formation of the hermetic seal is signalled at the time of said formation by said detection device which detects increased air pressure in a space which is open to the atmosphere before hermetic sealing has taken place, but which becomes closed to the atmosphere after recovery, the air in said space being heated by the heating of the covering member; and withdrawing said detection device without breaking the hermetic seal.

11. A process for preparing an assembly comprising a splice case which is hermetically sealed around a splice between pressurized cables, which process comprises:

bringing together around the splice a closure article comprising first and second members forming a generally tubular structure having a central cavity portion and with a rigid dimensionally stable container member positioned therein, the first member being heat-recoverable and the second member being non-heat-recoverable, the closure article being provided with means for maintaining said members together during heat recovery of said first member;

inserting between the first member and the substrate a probe connected to a detection device for detecting increased air pressure;

heating said structure to cause heat recovery of said first member and hermetic sealing of said first and second members to each other and to the pressurized cable; and detecting the formation of the hermetic seal at the time of said formation via the detection device which detects increased air pressure in a space within said rigid container member which is open to the atmosphere before hermetic sealing has taken place but which becomes closed to the atmosphere when said hermetic sealing has taken place, the air in said space being heated by the heating of said structure.

12. The process as claimed in claim 11 wherein said probe is made of a material which can be melted, crushed, or otherwise deformed after use and is so deformed to preserved the hermetic seal.

13. The process as claimed in claim 11 wherein mastic or adhesive is placed between first member and the substrate where the probe is inserted to preserve the seal after the probe is removed.

* * * * *